United States Patent [19]
Bruckert et al.

[11] Patent Number: 5,987,012
[45] Date of Patent: Nov. 16, 1999

[54] METHOD OF HANDING OFF AND A WIRELESS COMMUNICATION DEVICE

[75] Inventors: Eugene J. Bruckert, Arlington Heights; Richard J. Vilmur, Palatine, both of Ill.

[73] Assignee: Motorola, Inc., Schaumburg, Ill.

[21] Appl. No.: 08/769,562

[22] Filed: Dec. 19, 1996

[51] Int. Cl.⁶ ...................................................... H04Q 7/00
[52] U.S. Cl. ............................................. 370/331; 370/342
[58] Field of Search ..................................... 370/331, 332, 370/335, 342; 375/200; 455/442

[56] References Cited

U.S. PATENT DOCUMENTS

| | | | |
|---|---|---|---|
| 5,101,501 | 3/1992 | Gilhousen et al. | 455/33 |
| 5,109,390 | 4/1992 | Gilhousen et al. | 375/1 |
| 5,267,261 | 11/1993 | Blakeney II et al. | 375/1 |
| 5,392,287 | 2/1995 | Tiedemann, Jr, et al. | 370/95.1 |
| 5,490,165 | 2/1996 | Blakeney II et al. | 275/205 |
| 5,509,015 | 4/1996 | Tiedemann, Jr. et al. | 370/95.3 |
| 5,561,618 | 10/1996 | Dehesh | 364/725 |
| 5,577,022 | 11/1996 | Padovani et al. | 370/332 |
| 5,640,414 | 6/1997 | Blakeney, II et al. | 375/200 |
| 5,754,583 | 5/1998 | Eberhardt et al. | 375/200 |

OTHER PUBLICATIONS

*European Telecommunication Standard*, European Digital Cellular Telecommunications System (Phase 2); Radio Subsystem Link Control (GSM 05.08), European Telecommunication standards Institute, Aug. 1995, pp.1–17.

*TIA/EIA Interim Standard, Mobile Station–Base Station Compatibility for Dual–Mode Wideband Spread Spectrum Cellular System*, TIA/EIA/IS–95–A, May 1995, pp.6–61 to 6–64, 6–81 to 6–90, 6–171 to 6–176, and 7–21 to 7–26.

*Primary Examiner*—Chi H. Pham
*Assistant Examiner*—Kim T. Nguyen
*Attorney, Agent, or Firm*—Donald C. Kordich; Lalita P. Williams

[57] ABSTRACT

A wireless communication device (100) can be handed off while operating in the slotted mode of a CDMA system. The wireless communication device (100) stores, prior to entering slotted mode, an Active Set including at least one active pilot and a Neighbor Set including a plurality of neighbor pilots. At least one receiver searcher (109) scans the at least one active pilot and at least one of the plurality of neighbor pilots prior to an assigned slot. A logic and control circuit (113) includes in the Active Set, prior to the assigned slot, at least two pilots of the at least one active pilot and the at least one of the plurality of neighbor pilots scanned prior the assigned slot. At least two of a plurality of receiver fingers (107) simultaneously monitor the Paging Channels of the at least two pilots during the assigned slot.

1 Claim, 2 Drawing Sheets

METHOD OF HANDING OFF AND A WIRELESS COMMUNICATION DEVICE

FIELD OF THE INVENTION

The present invention relates generally to the field of digital communication, and more particularly to a wireless communication device and a method of handing off. The invention is especially suited for use in wireless communication devices that utilize Code-Division Multiple Access (CDMA) having a slotted mode feature, and will be particularly described in that connection.

BACKGROUND OF THE INVENTION

Interim Standard IS-95-A (IS-95) has been adopted by the Telecommunications Industry Association for implementing CDMA in a Personal Communications Services (PCS) or cellular system. In either the PCS or cellular system, a mobile station, such as a wireless communication device, communicates with any one or more of a plurality of base stations dispersed over a geographic area. In a system that employs CDMA technology, the down-link communication between the base stations and the mobile stations can take place over a Pilot Channel, Forward Traffic Channels, and a Paging Channel, among others.

On the Pilot Channel, each base station continuously transmits a pilot signal having the same spreading code but with a different phase offset. A mobile station can distinguish the pilot signals from one another by the applied phase offset, which allows the mobile station to identify the base station transmitting the pilot signal. Furthermore, a mobile station can measure the signal-to-noise of each pilot signal, which indicates the pilot's relative signal strength.

IS-95 specifies four sets of pilots collectively referred to as the Pilot Set—the Active Set, the Candidate Set, the Neighbor Set, and the Remaining Set. The Active Set are pilots associated with Forward Traffic Channels assigned to the mobile station for demodulating calls. That is, when in a "call," the mobile station demodulates the Forward Traffic Channels of the pilots of the Active Set. The Candidate Set are pilots that have been received by the mobile station with sufficient strength to indicate that the associated Forward Traffic Channels could be successfully demodulated, but are not currently in the Active Set. The Neighbor Set are pilots that are not currently in the Active Set or Candidate Set but are likely future candidates for handoff. The Neighbor Set normally corresponds to pilots that are in close geographical areas to the mobile station. The Remaining Set are all possible pilots in the current system on the current CDMA frequency assignment, excluding the pilots in the Neighbor Set, the Candidate Set, and the Active Set.

As the mobile station moves from a region covered by one pilot to another region covered by another pilot, the relative strength of the pilot signals as received by the mobile station will change, and it will be desirable to hand off to another pilot. According to IS-95, the mobile station--whether in an idle state or in a call--is required to assist in the handoff process by measuring the strength of pilot signals.

When in the idle state, the mobile station continuously searches for the strongest pilot signal in the Active Set, Neighbor Set, and Remaining Set. If the mobile station determines that one of the Neighbor Set or Remaining Set pilot signals is sufficiently stronger than the pilot of the Active Set, the stronger pilot is placed in the Active Set, and an idle handoff is thus made to the stronger pilot.

When in a call, the procedure for handoff is more complex, and involves the Candidate Set and the system's infrastructure. The mobile station promotes stronger pilots from the Neighbor Set or the Remaining Set to the Candidate Set, and then notifies the infrastructure of the new Candidate Set via a Pilot Strength Measurement Message over the Paging Channel. After receipt and evaluation of the Pilot Strength Measurement Message, the infrastructure may then promote some of the pilots of the new Candidate Set to the Active Set, thus creating a new Active Set. The infrastructure will subsequently notify the mobile station of the new Active Set via a Handoff Direction Message over the Traffic Channel; and, the mobile station will update its Active Set, Candidate Set, and Neighbor Set in accordance with the Handoff Direction Message. The mobile station will then demodulate the call using the pilots of the Active Set, to which the call is handed off. This process of updating the Pilot Set is commonly referred to as "pilot set maintenance."

The Paging Channel is used not only for transmitting control information relating to pilot set maintenance, but also for notifying the mobile station of an incoming call by way of a page. Because pages to a particular mobile station may occur infrequently, IS-95-A provides for a slotted mode feature, which allows a mobile station to operate in a reduced power mode, thus conserving battery power of the mobile station.

The Paging Channel is divided into 80 millisecond (ms) intervals called paging channel slots, and each mobile station operating in the slotted mode is assigned a specific slot of a periodic slot cycle in which they monitor the Paging Channel. For example, a slot cycle with a period of 2.56 seconds has 32 slots of 80 ms each. Because the mobile station needs only to monitor the Paging Channel during its assigned slot, at all other times of the slot cycle the mobile station can "sleep," that is, go into the reduced power mode by turning off all functions not necessary to "wake up "the mobile station in time to receive the assigned slot.

Because the mobile station is not able to receive and measure pilot signal strengths while it sleeps, idle handoffs and normal pilot set maintenance are not occurring. While asleep, the mobile station may move into another region, and, consequently, the Active Set before going to sleep will not specify the strongest pilot in the new location. Consequently, when the mobile station awakes, it will not be monitoring the Paging Channel transmitted from the pilot with the strongest signal.

A conventional way for acquiring the strongest pilot for monitoring the Paging Channel is for the mobile station to wake up early enough to search for the strongest pilot of the Active Set and the Neighbor Set. Each pilot is scanned and the signal strength measured. The pilot that has the strongest received signal that is sufficiently greater than the measured signal strength of the pilot of the Active Set is then assigned to the Active Set, and a handoff to the stronger pilot occurs before the assigned slot for monitoring the Paging Channel.

A scan of the pilots of the Active Set and the Neighbor Set prior to the assigned slot has the disadvantage of consuming a portion of the slot cycle that the mobile station could be asleep. For example, observations of the conventional mobile station revealed that, for a slot cycle of 1.28 seconds and a Neighbor Set of 10 pilots, the mobile station is awake 67 percent of the 1.28-second slot cycle.

A need therefore exists for a wireless communication device and a method of handing off that reduces the amount of time that the mobile station is awake during the slot cycle.

DESCRIPTION OF THE PREFERRED EMBODIMENTS

Figure 1:
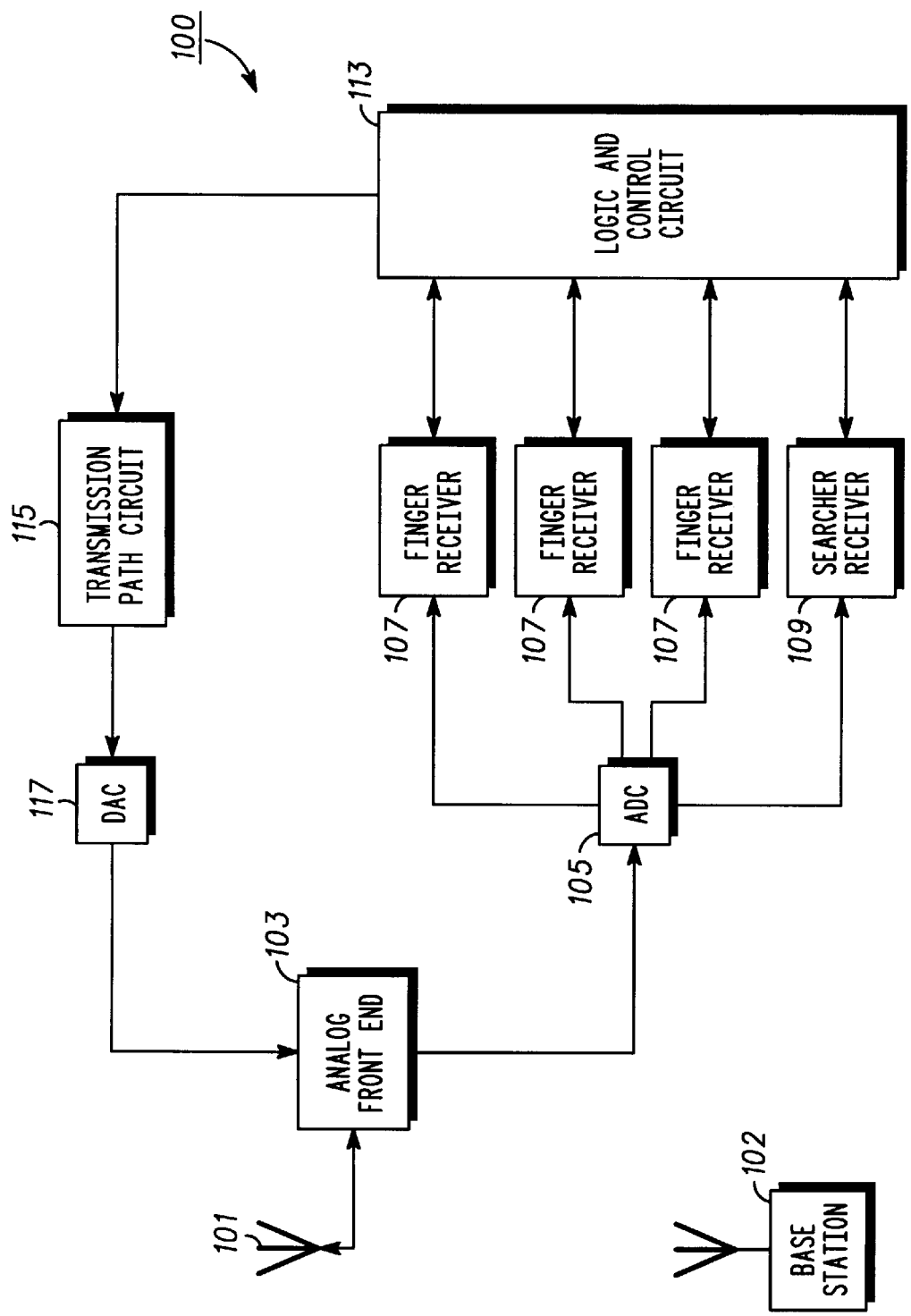
FIG. 1 is an electrical block diagram of a wireless communication device.

The method and wireless communication device described herein provides hand off of a wireless communication device that is operating in the slotted mode. The method and wireless communication device provides an advantage over conventional methods and wireless communication devices in that the amount of time that the wireless communication device is awake during the slot cycle is reduced, thus saving battery power and resulting in longer standby times for the wireless communication device.

According to the present invention, the foregoing advantages are principally provided by a receiver searcher that scans at least one of the neighbor pilots during the assigned slot and/or by use of a Hot Neighbor Set. Further, the receiver searcher scans the active pilot or pilots, and possibly pilots of the Hot Neighbor Set, prior to the assigned slot, and then receiver fingers monitor the Paging Channel of the pilots of the Active Set during the assigned slot while the receiver searcher scans the neighbor pilots. Under certain conditions, such as when one or more of the neighbor pilots have a measured signal strength that is greater than the measured signal strength of the active pilot or pilots, a logic and control circuit adds the stronger scanned neighbor pilot or pilots to the Active Set by replacing the weak active pilot or pilots in the Active Set with the stronger scanned neighbor pilot or pilots. Thus, the wireless communication device will be handed off to the pilot or pilots of the new Active Set when it monitors the Paging Channel of the new Active Set.

Because at least one of the neighbor pilots is scanned during the assigned slot, when the wireless communication device must be awake to monitor the Paging Channel, the time that the wireless communication device is awake during the slot cycle is reduced by the amount of time that each scan of a neighbor pilot is "shifted" to the assigned slot. For example, if all of the neighbor pilots were scanned during the assigned slot instead of prior to the assigned slot as in the conventional art, then the amount of time that the wireless communication device remains asleep is increased by the amount of time to perform the scan of all the neighbor pilots.

According to an aspect of the invention, as many of the neighbor pilots as time permits during the assigned slot are scanned. In some situations, for example, if there are a small number of neighbor pilots, all of the neighbor pilots can be scanned during the duration of the assigned slot. There can be situations, however, when not all of the neighbor pilots can be scanned during the assigned slot due to limitations imposed by the scan speed of a receiver and the duration of the assigned slot.

In accordance with another aspect of the invention, the receiver fingers that are not assigned to monitor the Paging Channel assist the receiver searcher to scan the neighbor pilots. Because neighbor pilots are being scanned simultaneously, more neighbor pilots can be scanned than when scanned by a single receiver searcher.

The inability to scan all of the neighbor pilots during the assigned slot is not a concern if a sufficiently strong neighbor pilot has not been scanned prior to the end of the assigned slot. Furthermore, even if a sufficiently strong neighbor pilot has not been scanned prior to the end of the assigned slot, the inability to scan all of the neighbor pilots during the assigned slot is not a concern if the pilot or pilots of the Active Set are of acceptable strength or quality.

If, however, the active pilot or pilots are not of acceptable strength or quality and none of the measured signal strengths of the neighbor pilots is great enough so that a neighbor pilot will replace the active pilot, under such conditions, and in accordance with another aspect of the invention, the receiver searcher (and possibly the receiver fingers) continues to scan the neighbor pilots, and possibly one or more of the remaining pilots, after the assigned slot, thus improving the likelihood that a sufficiently strong neighbor pilot or remaining pilot will be found to replace the active pilot of unacceptable strength and quality. This aspect has the drawback that the wireless communication device will be awake for the portion of the time that it could be asleep, but it still has advantages over the conventional art because the scans of some of the neighbor pilots will occur during the assigned slot.

Further, in accordance with another aspect of the invention, the Neighbor Set has the Hot Neighbor Set that includes a subset of the plurality of neighbor pilots called "hot neighbor pilots," and the neighbor pilots in the Neighbor Set but not in the Hot Neighbor Set are called "cold neighbor pilots." The receiver searcher (and possibly the receiver fingers) scans the hot neighbor pilots before the cold neighbor pilots. The order of the scan of the hot neighbor pilots is made according to the measured signal strengths of the scanned neighbor pilots from the previous scan, e.g., from strongest to weakest. If remaining pilots are scanned, their signal strengths are also considered in determining the Hot Neighbor Set.

The aspect of a Hot Neighbor List is advantageous in that it improves the likelihood that a sufficiently strong neighbor pilot, if one exists, will be scanned during the assigned slot, thus making it unnecessary to scan neighbor pilots or remaining pilots beyond the assigned slot.

In another aspect of the invention, the receiver searcher (and possibly the receiver fingers) scans at least one of the neighbor pilots prior to the assigned slot, and the logic and control circuit determines if any of the measured signal strengths of the at least one of the neighbor pilots is greater than the measured signal strength of the active pilot. If so, the wireless communication device is handed off to one of the strong neighbor pilots by replacing the weak active pilot with one of the strong neighbor pilots. This aspect of scanning prior to the assigned slot has the advantage of improving the likelihood that the wireless communication device will successfully demodulate the paging signal during the assigned slot.

In another aspect of the invention, the Active Set can include more than one Active Pilot, and the strongest active pilots and neighbor pilots scanned prior to the assigned slot are included in the Active Set prior to the assigned slot. Thus, more than one Paging Channel transmitted from multiple base stations can be simultaneously demodulated, and the likelihood that the wireless communication device will successfully demodulate the paging signal during the assigned slot is improved.

In another aspect of the invention, the size of the Hot Neighbor Set is dynamically adjusted according to the strength or quality of the active pilot's signal. The size can be maintained or reduced if the active pilot is of acceptable strength or quality, and the size can be increased if the strength and quality of the active pilot is not acceptable.

The features of the Hot Neighbor Set and the dynamic adjustment of the Hot Neighbor Set is particularly useful when used in tandem with the feature of scanning the neighbor pilots prior to the assigned slot. The Hot Neighbor Set prioritizes and limits the number of neighbor pilots that are scanned before the assigned slot, thus improving the likelihood that a sufficiently strong neighbor pilot will be scanned, without having to scan the entire Neighbor Set prior to the assigned slot.

Additional advantages and novel features of the invention will be set forth in part in the description which follows, wherein I have shown and described only the preferred embodiments of the invention, and in part become apparent to those skilled in the art upon examination of the following detailed description or may be learned by practice of the invention. The invention is capable of other and different embodiments, and its several details are capable of modification, all without departing from the scope of the invention. The advantages of the invention may be realized and attained by means of the instrumentalities and combinations particularly pointed out in the appended claims.

Reference will now be made in detail to preferred embodiments configured according to the present invention.

FIG. 1 is a an electrical block diagram of a wireless communication device 100, e.g., a radiotelephone, that can employ the method according to the invention. This figure illustrates, among other things, an antenna 101 for receiving signals from base stations 102 (only one shown) and transmitting signals originated by wireless communication device 100. An analog front end 103 processes the received signals and provides them to an analog-to-digital converter (ADC) 105. Analog front end 103 includes a Received Strength Signal Indicator (RSSI) that provides a measure of the strength the composite received signal, such as, an integrated strength measurement of the received signal. The digitized received signals are provided to a rake receiver comprised of a plurality of receiver fingers 107 and at least one receiver searcher 109, all receivers being connected in parallel. The output of the receiver fingers and receiver searcher is provided to the logic and control circuit 113 for further processing. Logic and control circuit 113 also provides data to transmission circuit path 115, which processes the data and provides the processed data to a digital to analog circuit (DAC) 117. The analog signal output by DAC 117 is provided to analog front end 103 for transmission to base stations 102 via antenna 101.

Although logic and control circuit 113 is shown as a separate element from the receivers, one of ordinary skill will recognize that portions of the logic and control circuit may reside in the receivers. The operation of wireless communication device 100, including the receiver fingers and searcher receiver, is controlled in part by a logic and control circuit 113, which has a memory for storing data and program instructions to implement the method according to the invention and a microprocessor for executing the program instructions to control the operation of wireless communication device 100.

When wireless communication device 100 is awake, antenna 101 receives, from the base station transmitting the active pilot, a Pilot Set. A record of the Pilot Set is stored in logic and control circuit 113 before wireless communication device 100 goes to sleep.

Receiver searcher 109 is capable of scanning the pilot channel signal of the base stations 102 to determine their pilot channel strength. Receiver searcher 109 determines pilot channel strength by a complex correlation process which provides a measure of $E_c/I_o$ in decibels (dB), where $E_c$ is a measure of the pilot energy and $I_o$ is the total power spectral density in the received bandwidth. $E_c/I_o$ represents a signal-to-signal-plus-noise ratio.

Receiver searcher 109 also provides information to logic and control circuit 113 from which logic and control circuit 113 calculates another measure of the pilot channel strength, $I_a$, which is the composite power spectral density of all the scanned pilots, or $I_b$, which is the composite power spectral density of all the scanned base station transmissions.

A pilot signal emanating from a base station 102 may travel along several different delayed paths called "rays," thus producing multi-path signals. In performing a scan of the pilot channel signal of a particular base station 102, the strong rays of the particular base station 102 are found. If the pilot is an active pilot, receiver fingers 107 will be assigned to the strong rays for demodulating the Paging Channel of the active pilot.

When assigned to a pilot in the mobile station idle mode, a receiver finger 107 locks onto and demodulates the Paging Channel of the associated base station 102. Furthermore, logic and control circuit 113 includes a Cyclical Redundancy Code (CRC) checker. The CRC checker performs an error check of the paging message, which provides a measure of whether the paging message was received.

In an alternate embodiment, any of the receiver fingers 107 also have the capability of receiver searcher 109 and thus can scan the pilot channel signal of base stations 102 and provide information to logic and control circuit 113 from which logic and control circuit 113 calculates $I_a$ or $I_b$.

The method of use and operation of the wireless communication device as constructed and described above will now be described with reference to FIG. 2, which is a flow chart illustrating a method 200 of handing off in slotted mode.

Logic and control circuit 113 wakes up the portions of wireless communication device 100 that were asleep during the slot cycle. (Step 201.) Receiver searcher 109 scans the current active pilot prior to the assigned slot, (step 203), and, as part of the scan, measures the signal strength of the active pilot. During the scan, the RSSI is also measuring the strength of the composite received signal.

Logic and control circuit 113 assigns one or more of receiver fingers 107 to the strong rays of the active pilot, (step 205), and those receiver fingers demodulate the Paging Channel of the active pilot during the assigned slot.

The receiver searcher can alone perform the scanning of the active pilots and neighbor pilots. Alternatively, the receiver fingers can assist in scanning the active pilots prior to the assigned slot, and the receiver fingers that are not assigned to monitor the Paging Channel are assigned to assist the receiver searcher in scanning the plurality of neighbor pilots during the assigned slot. (Step 207.) This is an important feature of the invention because it increases the rate at which pilots can be scanned.

Furthermore, the Neighbor Set can include a Hot Neighbor Set. The Hot Neighbor Set includes the neighbor pilots that are expected to have strong signals compared to other members of the Neighbor Set. For example, the logic and control circuit predetermines the Hot Neighbor Set according to the signal strengths of the active pilot, hot neighbor pilots, and possibly the cold neighbor pilots and remaining pilots, that were measured during the previous slot cycle.

Figure 2:
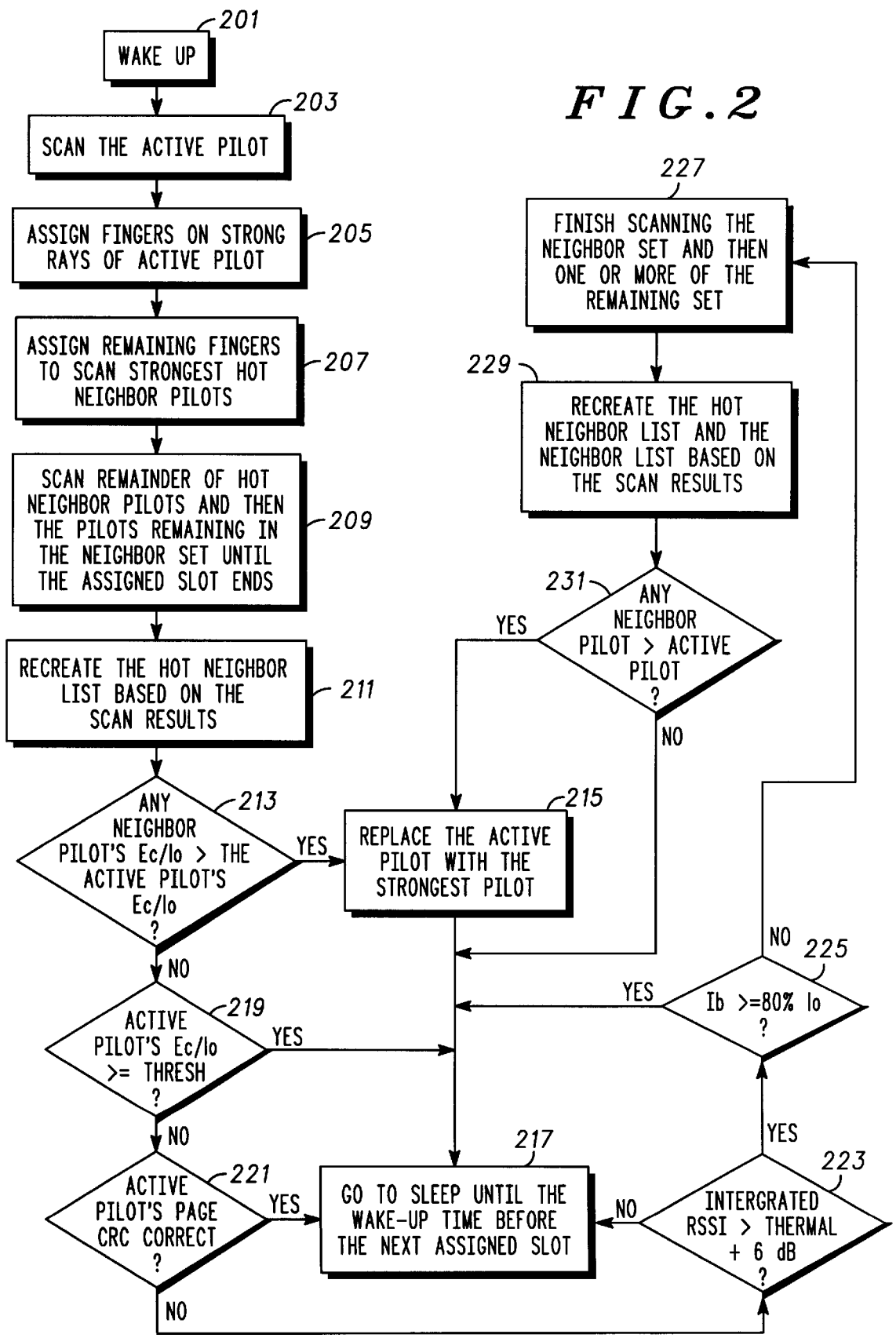
FIG. 2 is a flow chart illustrating a method of handing off in slotted mode.

In the embodiment shown in FIG. 2, the hot neighbor pilots are scanned from the strongest to the weakest of the hot neighbor pilots, (step 207), and the hot neighbor pilots are scanned before the cold neighbor pilots. (Step 209.) This is an important feature of the invention because, under the constraints of scan speed and time, it improves the likelihood that a strong neighbor pilot will be found.

The neighbor pilots are scanned during the assigned slot and, if necessary, after the assigned slot. (Steps 209 and 227.) To take full advantage of the time that the wireless communication device must be awake to demodulate the Paging Channel, the signal strength of as many of the neighbor pilots, and possibly the remaining pilots, as time permits during the assigned slot are measured. (Step 209.)

Additionally, some of the neighbor pilots can be scanned prior to the assigned slot. For example, if the current Active Set included only one active pilot, and if any of the measured signal strengths of the neighbor pilots is greater than the measured signal strength of the active pilot, the wireless communication device can be handed off to the strong neighbor pilot, prior to the assigned slot, by replacing the active pilot with a one of the neighbor pilots that has a measured signal strength that is greater than the measured signal strength of the active pilot.

If simultaneous demodulation is employed, receiver searcher 109 (and possibly receiver fingers 107) scans the current active pilots and at least some of the neighbor pilots prior to the assigned slot, and the wireless communication device can be handed off to one or more of the strong neighbor pilots that has a measured signal strength that is greater than the measured signal strength of the active pilot or pilots. For example, consider the possibilities if the Active Set can include a maximum of two active pilots for demodulation. After scanning the active pilots and at least some of the neighbor pilots prior to the assigned slot, logic and control circuit 113 determines which two of the scanned pilots have the strongest measured signal strength, and these two strongest pilots are included in the Active Set. For example, if two neighbor pilots have signal strengths greater than the signal strength of each of the current two active pilots, then the two neighbor pilots will be added to the Active Set by replacing the two active pilots.

Scanning some of the neighbor pilots prior to the assigned slot is an important feature of the invention because it improves the likelihood that the wireless communication device will successfully demodulate the Paging Channel during the assigned slot should the active pilot signal not be of sufficient strength for successful demodulation. This feature can advantageously be used with the Hot Neighbor Set feature by scanning some or all of the hot neighbor pilots prior to the assigned slot.

After the assigned slot, and if the Hot Neighbor feature is utilized, logic and control circuit 113 determines the Hot Neighbor Set and its size according to the scan results, i.e., according to the measured signal strengths of the active pilot and the plurality of neighbor pilots. (Step 211.) For example, if three pilots are stronger than a Hot Neighbor Set threshold, then the three strongest pilots are included.

The threshold of the Hot Neighbor Set can be dynamically adjusted according to the strength or quality of the active pilot's signal. If, the active pilot is of acceptable strength or quality, the threshold of the Hot Neighbor Set need not be reduced, and, if the strength or quality is particularly strong, the threshold of the Hot Neighbor Set can be increased, thus possibly reducing the number of pilots in the Hot Neighbor Set. If, the active pilot is not of acceptable strength and quality, the threshold of the Hot Neighbor Set should be reduced, thus possibly increasing the number of pilots in the Hot Neighbor Set.

Next, logic and control circuit 113 determines if any of the measured signal strengths of the neighbor pilots is greater than the measured signal strength of the active pilot. (Step 213.) If so, in this particular embodiment, the active pilot is replaced with the strongest one of the neighbor pilots that is stronger than the active pilot, (step 215), and the wireless communication device goes to sleep until the next wake-up time before the next assigned slot, (step 217). Accordingly, when the wireless communication device wakes during the next slot cycle, it will demodulate the Paging Channel of the new active pilot (provided that the feature of scanning some of the neighbor pilots prior to the assigned slot is not utilized) and thus the wireless communication device will be handed off to the new active pilot.

If simultaneous demodulation is employed, the Active Set can include one or more active pilots. In steps 213 and 215, the weak active pilots can be replaced by one or more of the strong neighbor pilots.

Referring back to step 213, if none of the measured signal strengths of the neighbor pilots is greater than the measured signal strength of the active pilot, then logic and control circuit 113 determines whether it is necessary to do additional scanning of the neighbor pilots after the assigned slot, by determining if the signal of the active pilot is of acceptable strength or quality. If the active pilot's signal is of acceptable strength or quality, there is no need to further scan the neighbor pilots to find a neighbor pilot suitable for a handoff. Acceptable strength or quality can be determined by any one or more tests. In the method shown in FIG. 2, there are four decision steps, (steps 219, 221, 223, and 225), any one of which could prevent further scanning of the neighbor pilots by putting the wireless communication device to sleep, (step 217).

In the first decision step, logic and control circuit 113 determines if the active pilot's signal strength is greater than a threshold. (Step 219.) If so, the wireless communication device is put to sleep. (Step 217.)

If not, logic and control circuit 113 determines if the CRC of the demodulated page message is correct. (Step 221.) If so, the wireless communication device is put to sleep. (Step 217.) If not, logic and control circuit 113 determines if the integrated strength measurement of the composite receive signal (via the RSSI) is greater than a threshold, e.g., thermal noise (no signal) plus 6 decibels. (Step 223.) If not, the wireless communication device is likely to be in an area where signals are weak, and it would be futile to further scan for a strong pilot. Therefore, the wireless communication device is put to sleep. (Step 217.) If the integrated strength measurement of the composite receive signal (via the RSSI) is greater than a threshold, then a final test can be performed.

One embodiment of the final test would compare the scanned power spectral density and compare it to the total power spectral density $I_o$. Normally the pilot channel energy is 20% of the maximum base station power output. A summation of the scanned pilot energies, $I_a$, could then be compared to 20% of $I_o$ to determine if any strong pilot channels have not been scanned. If $I_a$ is greater than 80% of 20% of $I_o$ then there is a high probability that there are no more strong pilot channels to be scanned.

Another embodiment that is more accurate but more complex is to calculate a Fast Haddamard Transform (FHT) for all scanned rays above a predetermined noise threshold. The FHT produces energy values for all the CDMA channels that form the composite ray, and the energy values are summed to calculate the energy in the ray. Then for all scanned rays, $I_b$ is equal to the sum of the energy values of the scanned rays. If $I_b$ is greater than 80% of $I_o$ then there is a high probability that there are no more strong pilot channels to be scanned. (Step 225.) If $I_b$ is greater than 80% of $I_o$, the wireless communication device is put to sleep. (Step 217.) If not, then the scanned pilots are not of acceptable strength and quality, and further scanning of the remaining pilots, and possibly one or more of the remaining pilots, should be performed to find the strong interfering pilot or pilots. (Step 227.)

If it is necessary to do the additional scanning beyond the assigned slot, then the logic and control circuit 113 determines the Hot Neighbor Set and its size, if utilized, and the Neighbor Set according to the measured signal strengths of the active pilot, neighbor pilots, and remaining pilots. (Step 229.) Next, logic and control circuit 113 determines if any of the measured signal strengths of the neighbor pilots is greater than the measured signal strength of the active pilot. (Step 231.) If so, the active pilot is replaced with the strongest one of the neighbor pilots that is stronger than the active pilot, (step 215), and the wireless communication device goes to sleep until the next wake-up time before the next assigned slot, (step 217). The wireless communication device will demodulate the Paging Channel of the new active pilot (provided that the feature of scanning some of the neighbor pilots prior to the assigned slot is not utilized) and thus the wireless communication device will be handed off to the new active pilot.

If, in step 231, none of the measured signal strengths of the neighbor pilots is greater than the measured signal strength of the active pilot, then the wireless communication device goes to sleep without replacing the active pilot.

In summary, a wireless communication device and method of handoff has been described that utilizes a Hot Neighbor Set and/or scans neighbor pilots during the time that the wireless communication device must be awake to demodulate the Paging Channel in an effort to find a neighbor pilot suitable for hand off at the next assigned slot. The feature of a Hot Neighbor Set prioritizes the scan of the neighbor pilots. The feature of shifting the scanning of at least some of the neighbor pilots to the assigned slot results in increasing the time that the wireless communication device can sleep. Furthermore, the features of simultaneous scanning of neighbor pilots, conditional scanning after the assigned slot, truncated scanning prior to the assigned slot, and simultaneous demodulation of the paging signal also have been described, which can further reduce the time spent awake during the slot cycle or increase the likelihood that the Paging Channel will be successfully demodulated and thus a page not missed.

Those skilled in the art will recognize that various modifications and variations can be made in the method and apparatus of the present invention and in construction of this apparatus without departing from the scope or spirit of this invention.

What is claimed is:

1. A method of autonomously handing off a wireless communication device operating in an idle state slotted mode to one or more of a plurality of base stations, the wireless communication device storing prior to entering slotted mode, an Active Set including at least one active pilot, a Neighbor Set including a plurality of neighbor pilots, and an assigned slot to monitor a Paging Channel therein, the wireless communication device includes at least one receiver searcher and a plurality of receiver fingers, the method comprising the steps of:

prior to the assigned slot:
   a) determining a Hot Neighbor Set that includes a subset of the plurality of neighbor pilots, the subset of the plurality of neighbor pilots of the Hot Neighbor Set called hot neighbor pilots, and the neighbor pilots in the Neighbor Set but not in the Hot Neighbor Set called cold neighbor pilots;
   b) assigning the at least one receiver searcher to scan the at least one active pilot and the at least one of the hot neighbor pilots;
   c) scanning the at least one active pilot and the at least one of the hot neighbor pilots;
   d) assigning at least two of a plurality of receiver fingers to monitor a plurality of Paging Channels of the base stations transmitting the at least two pilots of the scanned at least one active pilot and the at least one of the hot neighbor pilots;
   e) assigning the at least one receiver searcher and the plurality of receiver fingers not assigned to monitor the plurality of Paging Channels to scan, as time permits during the assigned slot, the hot neighbor pilots that have not been scanned and then the cold neighbor pilots;

during the assigned slot:
   f) simultaneously monitoring the plurality of Paging Channels of the base stations transmitting the at least two pilots;
   g) scanning the hot neighbor pilots that have not been scanned prior to the assigned slot and then the cold neighbor pilots; and after the assigned slot:
   h) re-determining the Hot Neighbor Set according to the measured signal strengths of the at least one active pilot, the hot neighbor pilots, and the cold neighbor pilots.

\* \* \* \* \*